Nov. 10, 1953 P. E. HAWKINSON 2,658,258
TIRE BUFFING BAND
Filed Oct. 16, 1950

Inventor
Paul E. Hawkinson
By Merchant & Merchant
Attorneys

Patented Nov. 10, 1953

2,658,258

UNITED STATES PATENT OFFICE 2,658,258

TIRE BUFFING BAND

Paul E. Hawkinson, Minneapolis, Minn., assignor to Paul E. Hawkinson Company, Minneapolis, Minn., a corporation of Minnesota Application October 16, 1950, Serial No. 190,331

2 Claims. (Cl. 29—78)

My invention relates broadly to buffing or abrading wheels and, more specifically, to rasps for buffing or abrading away the rubber treads of pneumatic tire casings.

In the retreading of pneumatic tire casings, it is desirable that the worn portion of the tread be trued up preparatory to applying the new tread. This is commonly done on lathe-type buffing machines such as illustrated in my United States Patent No. 2,392,667. There are several types of abrading wheels utilized for this purpose. One such type is known as the tack rasp, in view of the fact that a plurality of sharp tacks are mounted in a sheet metal band and act as the cutting teeth therefor. Such rasps cut very rapidly but leave a very rough surface which is generally considered undesirable to lay a new tread upon. On the other hand, the buffing wheel and buffing band disclosed in my United States Patent No. 2,240,559 cuts relatively slowly but leaves a relatively smooth surface—a surface which is ideal for applying the new tread material.

The object of my invention is the provision of a buffing band for buffing wheels which combines the benefits of both of the above-described buffing elements and which, therefore, will buff treads relatively rapidly and relatively smoothly.

A still further object of my invention is the provision of a buffing band for buffing wheels of the type disclosed in my United States Patent No. 2,240,559, which has two groups of cutting teeth in circumferentially-spaced alternate arrangement which, together, present a relatively uninterrupted cutting surface, one of said groups including teeth which have relatively thin cutting surfaces and the other of said groups including teeth which have relatively thick cutting surfaces.

A still further object of my invention is the provision of a device of the type immediately above described, in which the relatively thin cutting teeth project laterally outwardly from the cutting band a distance greater than the relatively thick cutting teeth.

A still further object of my invention is the provision of a device of the class described which can be manufactured at a minimum of cost, which is light in weight, which is easy to ship, and which is relatively durable in use.

The above and still further objects of my invention will become apparent from the following detailed specification, appended claims, and attached drawings.

Referring to the drawings, wherein like characters indicate like parts throughout the several views.

Figure 4:
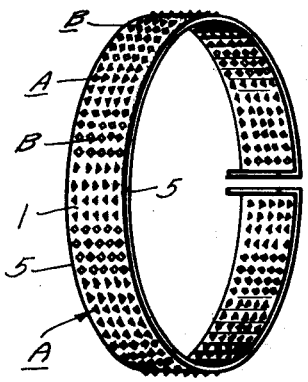
Fig. 4 is a view of my novel buffing band bent into circular operative form.
Figure 1:
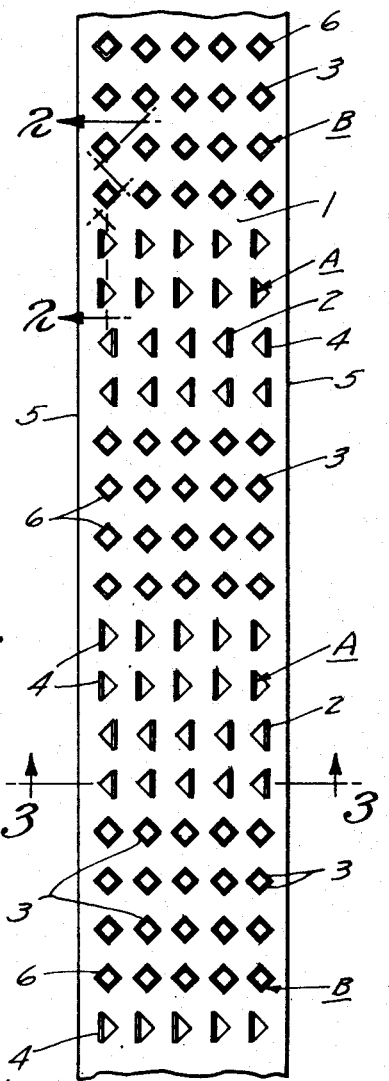
Fig. 1 is a fragmentary plan view of my invention.
Figure 2:
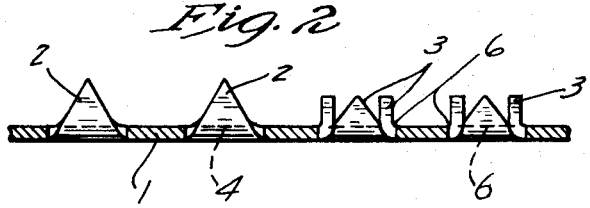
Fig. 2 is a fragmentary sectional view taken on the line 2—2 of Fig. 1.
Figure 3:
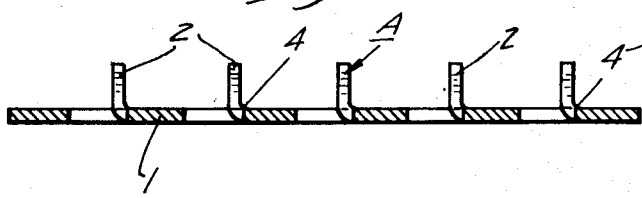
Fig. 3 is a sectional view on the same scale as Fig. 2 taken on the line 3—3 of Fig. 1.

Referring with greater particularity to the drawings, the numeral 1 indicates a body in the nature of a rectangular sheet metal band, that is formed in a flat condition but which is capable of being readily bent into circular form, as shown in Fig. 4. As shown, body 1 is provided with alternately arranged groups A and B of cutting teeth 2 and 3 respectively, which together form a relatively continuous cutting or abrading surface. It will be noted that the teeth 2 of group A are both laterally and longitudinally spaced from each other, are integrally formed with the body 1, and are bent therefrom on fold lines 4 which are substantially parallel to the side edges 5 of the body 1. Thus the teeth 2 present a relatively thin cutting surface, to wit, a surface only the thickness of the sheet metal from which the body 1 is formed.

On the other hand, the teeth 3 of the group B, likewise integrally formed with the body 1, are pressed therefrom on fold lines 6 which extend angularly with respect to the side edges 5 of the body 1—whereby to present a relatively thick cutting surface. It will be noted that the teeth 2 of the group A project laterally outwardly from the body 1 a distance greater than the teeth 3 of the group B.

When the body 1 is bent into circular form, as shown in Fig. 4, and applied to a buffing wheel, such as shown in my United States Patent No. 2,240,559, the teeth 2 of the group A will act much in the manner of tacks as the body 1 is rotated. In other words, the teeth 2 of the group A will cut relatively rapidly but will leave a relatively rough surface. This rough surface is immediately removed by each intervening group of teeth 3 of the group B. Thus, with my novel cutting band, a tread may be relatively quickly and efficiently buffed.

My invention has been thoroughly tested and found to be completely satisfactory for the accomplishment of the above objects; and, while I have shown a commercial embodiment thereof, it should be obvious that the same is capable of modification without departure from the spirit and scope of the invention as defined in the claims.

What I claim is:

1. In a device of the class described, an elongated sheet metal tire buffing band adapted to be secured to the peripheral surface of a rotatable buffing head, said band presenting a substantially uninterrupted buffing surface and comprising two groups of cutting teeth of different types in alternate arrangement, the teeth of one of said groups presenting relatively narrow cutting faces and the teeth of the other of said groups presenting relatively wide cutting faces, the teeth of said one group projecting laterally outwardly from said cutting band a distance greater than the teeth of said other group.

2. In a device of the class described, an elongated sheet metal tire buffing band adapted to be secured to the peripheral surface of a rotatable buffing head, said band presenting a substantially uninterrupted buffing surface and comprising two groups of cutting teeth of different types in alternate arrangement, the teeth of one of said groups presenting relatively narrow cutting faces and the teeth of the other of said groups presenting relatively wide cutting faces, all of said teeth being integrally formed with said band, the teeth of said one group being pressed outwardly from said band on fold lines parallel to a longitudinal side edge of said band, the teeth of said other group being pressed from said band on fold lines extending angularly with respect to said longitudinal side edge, the teeth of said one group extending laterally outwardly from said band a greater distance than the teeth of said other group.

PAUL E. HAWKINSON.

References Cited in the file of this patent

UNITED STATES PATENTS

| Number | Name | Date |
|---|---|---|
| D. 34,898 | Wagandt | Aug. 6, 1901 |
| 1,216,915 | Anderson | Feb. 20, 1917 |
| 1,317,615 | Cordell | Sept. 30, 1919 |
| 2,432,154 | Hawkinson | Dec. 9, 1947 |
| 2,561,472 | Hawkinson | July 24, 1951 |

FOREIGN PATENTS

| Number | Country | Date |
|---|---|---|
| 334,725 | Great Britain | Sept. 11, 1930 |
| 488,925 | Great Britain | July 12, 1938 |